G. M. S. TAIT.
PROCESS OF TREATING MILK AND OTHER LIQUIDS.
APPLICATION FILED JULY 28, 1913.
1,094,380.
Patented Apr. 21, 1914.
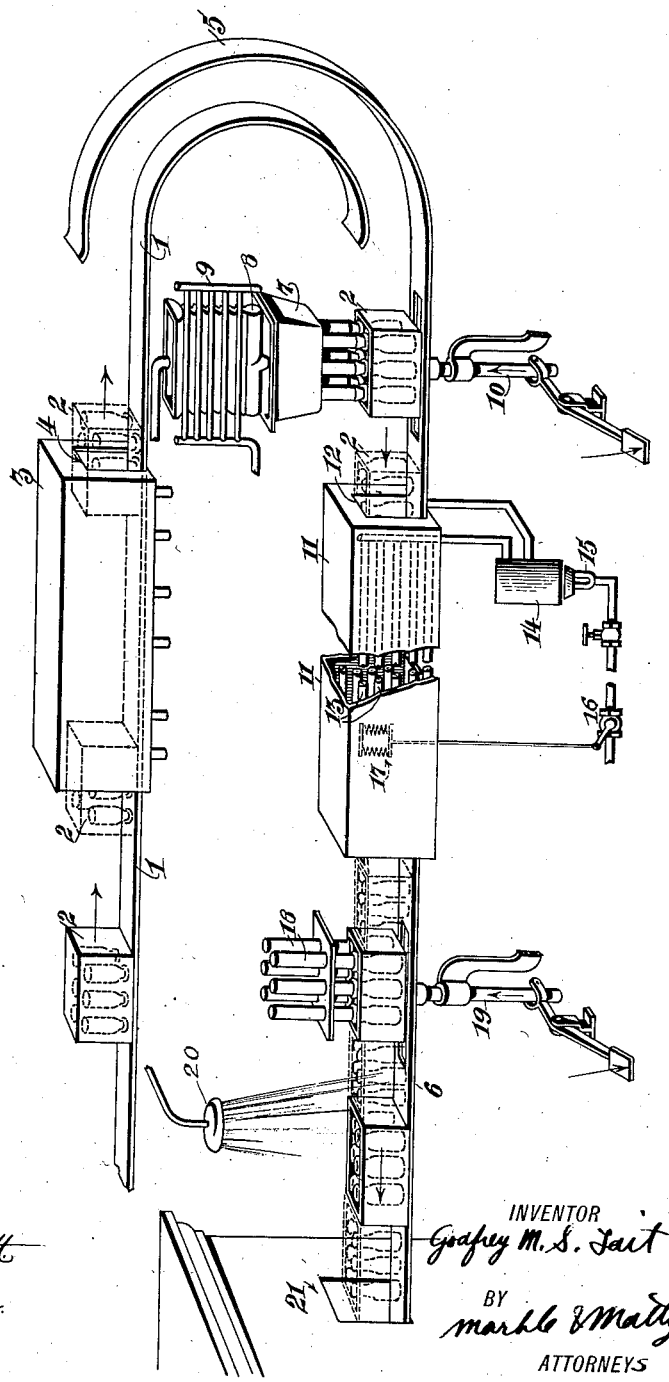
WITNESSES:
John T. Schrott
Annie Cooper.
INVENTOR
Godfrey M. S. Tait
BY
Marble & Matty
ATTORNEYS

UNITED STATES PATENT OFFICE.

GODFREY M. S. TAIT, OF WASHINGTON, DISTRICT OF COLUMBIA.

PROCESS OF TREATING MILK AND OTHER LIQUIDS.

1,094,380. Specification of Letters Patent. Patented Apr. 21, 1914.

Application filed July 28, 1913. Serial No. 781,633.

*To all whom it may concern:*

Be it known that I, GODFREY M. S. TAIT, a subject of Great Britain, residing at Washington, in the District of Columbia, have invented certain new and useful Improvements in Processes of Treating Milk and other Liquids, of which the following is a specification.

This invention relates to the sterilization or pasteurization of liquids; and it comprises, as a process, a process of sterilizing milk or other liquids in bottles or other containers, according to which the containers are first washed and scalded or otherwise sterilized, and while in a still highly heated condition from the washing are filled with preheated milk or other liquid, and without being allowed to cool the bottled milk or containers containing other liquid are subsequently maintained in a heated condition until the sterilization or pasteurization is completed, the sealing of the bottles or other containers being effected either before or after the completion of the pasteurization or sterilization.

More specifically, the invention comprises, as a process, a process of pasteurizing milk in bottles according to which the bottles are first washed and scalded and thereby sterilized, and without being allowed to cool appreciably, but while still in a highly heated condition and at or above the pasteurizing temperature are filled with milk preheated to or above the pasteurizing temperature, after which the bottled milk is prevented from cooling and maintained at the pasteurizing temperature until the pasteurization is completed, the heat of the preheated milk and of the heated bottles being retained and utilized to effect the pasteurization, a small amount of heat being supplied if necessary to prevent the bottled milk from cooling below this temperature, all as more fully hereinafter set forth and as claimed.

The present invention relates to the sterilizing or pasteurizing of milk or other liquids in the bottles or containers as distinguished from the pasteurization or sterilization in bulk.

The invention will be more particularly described in connection with the pasteurization of milk in bottles, but it will be understood that such description is by way of illustration and that the invention is applicable also to the treatment of other liquids such as beer, etc. In the pasteurization of milk it is necessary to heat the milk to a temperature of about 130 to 140° F. and to maintain such temperature for a considerable period of time to effect the pasteurization.

The present invention comprises such a process of pasteurization according to which the milk is first preheated and is filled into bottles themselves also in a highly heated condition, after which the milk in the bottles is kept at the pasteurization temperature to complete the pasteurization, the milk bottles being capped either before or after the completion of the pasteurization and the bottles being subsequently cooled and conveyed to a suitable refrigerating or storing apparatus.

More particularly, the invention comprises a combined process of washing and sterilizing the milk bottles and of filling and pasteurizing the same according to which the milk bottles are washed and scalded and are subsequently filled with preheated milk while still heated to a temperature above 130° F., the bottles being subsequently kept at such temperature to complete the pasteurization. According to this process the heat necessary for the pasteurization or sterilization is furnished partly by the heat contained in the heated bottles and partly by the preheating of the milk or other liquid, the bottled milk or other liquid being already at a temperature at or above that of pasteurization and it being necessary only to retain this heat and the temperature necessary for pasteurization until the pasteurization is completed. For retaining such heat it is necessary only that the bottled milk be kept in a sterilizer or pasteurizer similar in nature to the fireless cooker in which the cooling of the bottled milk is prevented and the temperature maintained at that of pasteurization, a small amount of heat being applied to the sterilizer if necessary to insure that the required temperature is maintained and to prevent cooling of the bottled milk.

On the accompanying drawing is shown an apparatus illustrative of the present invention, the various parts of this apparatus being for the most part shown diagrammatically.

The process of the present invention will be described in detail in connection with this drawing which is illustrative of one embodiment of the invention and of one form of apparatus in which the process of the present invention can be carried out. In this drawing a suitable conveyer is shown at 1 which may be of the roller or rail type and which may be provided with means (not shown) for insuring a regular and continuous travel or an intermittent travel of the crates of bottles thereon.

A washing apparatus is shown at 3 through which the crates 2 are adapted to pass on the conveyer 1 and in which the bottles in the crates 2, which crates and bottles are upside down, are subjected to washing with alkali or soap or other cleansing agent and are subsequently rinsed and scalded, the scalding water usually being near the boiling point and the bottles leaving the washing apparatus still heated to a temperature more or less close to the boiling point. The washer 3 is provided with doors 4 at its ends which, in the normal operation of the device, are filled and closed by the crates of bottles which pass through the washer in a continuous stream, these doors being of such a size that the crates practically fill the same. It will be understood that the washer 3 is provided with suitable pipes or other means for insuring the necessary washing and scalding of the bottles, but it is not deemed necessary to illustrate or describe such washing device in detail. From the washing device the crates 2 are conveyed to the end of the conveyer 1 onto the conveyer 5 which turns the crates upside down and conveys them to the filling device 7 which is operated by a foot lever 10, the crate being raised and the bottles themselves operating automatically the valves controlling the milk supply. The filler 7 is fed with milk preheated in the heater 8 by means of the steam coil 9 to about or above the pasteurization temperature, e. g. 130 to 150° or 160° F. This preheater is shown as a heater of the "flash" variety but it will be understood that other suitable heating means can be used for preheating the milk. Since the milk bottles are conveyed from the washing and scalding apparatus directly to the filling device they reach the filling device still in a highly heated condition and a temperature usually above that of pasteurization. By preheating the milk and filling the heated bottles with the preheated milk the pasteurization is started before the milk reaches the bottles and is continued immediately after reaching the bottles so that the pasteurization is begun before the bottles reach the pasteurizing apparatus, a very material saving in heat being thus effected and the process being very materially shortened and simplified. It is not necessary to heat cold bottles after filling them with cold milk or to first pasteurize the milk and cool it and bottle it in cold bottles, but the bottles are filled while still hot from the washing and scalding apparatus and the heat still contained in the bottles is made use of in effecting the pasteurization. The disadvantages incident to the filling of cold bottles with hot milk or of hot bottles with cold milk are also avoided and the milk immediately upon filling the bottles is already at or above the pasteurization temperature and requires merely a small amount of heat to maintain it at this temperature until the pasteurizing is completed. The preheating of the milk and of the bottles and the starting of the pasteurizing process is thus begun before the crates of bottles reach the main sterilizing apparatus and it is necessary only for such apparatus to maintain the bottles in a heated condition. Since only a small amount of heat is necessary for this purpose, as compared with the amount of heat necessary for first heating the milk and bottles, the sterilizer requires only a small amount of heat to be supplied to it.

In the apparatus illustrated, the sterilizer 11 which usually extends for a considerable distance, is shown as provided with doors 12 for the entrance and escape of the crates, the doors being practically closed by the crates which pass in a continuous stream on the conveyer 6 through the apparatus. The sterilizer 11 is shown as heated by steam coils or hot water coils 13 which in turn are heated by the gas heater 14, the gas burner 15 being controlled by the thermostat 17 in the sterilizer and by the controlling valve 16 so that the temperature can be maintained practically constant at about 130 to 140° F. The length of the sterilizing chamber can be made sufficient to insure the sterilization of the milk bottles while passing through it, the conveyer 6 being provided with suitable means (not shown) for insuring the progressive feed of the crates of bottles to and from the filling and capping device and through the sterilizer. The caps can be applied to the bottles in the crates either before or after the passage of the crates through the sterilizer.

In the embodiment of the invention illustrated, the capping device is shown at 18 and is arranged to cap the bottles after they come from the pasteurizer, the capping of the bottle being effected by the lever 19 which raises the crate against the capping devices. The bottles of milk which are now pasteurized and capped are cooled by the water spray 20 and are conveyed to the refrigerating or storing chamber 21.

It will be seen that in the embodiment of the invention illustrated the bottles are kept in crates into which they are suitably secured so that the crates may be conveyed into the washing device upside down and the bottles thoroughly washed, rinsed and scalded and allowed to drain, after which the crates are reversed by the conveyer 5 and reach the filling device right side up. Other suitable forms of washing apparatus can be used and other means for reversing the crates and bringing the bottles into an upright position. Also other means for heating the sterilizer can be employed, it being necessary only that the temperature of the sterilizer be maintained at the pasteurization temperature and that means be provided for maintaining the sterilizer or pasteurizer at this temperature. It will be seen that the process and apparatus of the present invention enables the pasteurization of milk or the sterilization of other liquids to be effected in a simple and efficient manner and that the heat contained in the bottles from the scalding and washing operation, together with the preheating of the milk, are made use of in effecting the pasteurization. It is advantageous to heat the milk to a temperature somewhat greater than that of pasteurization, for example, up to 150° F. or even higher, and it is also advantageous to fill the bottles while still heated above the pasteurization temperature, the bottles frequently reaching the filling apparatus from the washer at a temperature above 150° F. By using milk heated to such a temperature and bottling it in bottles also heated above the pasteurizing temperature the bottled milk is prevented from cooling below the pasteurizing temperature before it reaches the sterilizer and it is necessary for the sterilizer merely to prevent the cooling of the milk below the temperature necessary for pasteurization. The so-called sterilizer is in fact merely a heat retainer upon the principle of the fireless cooker. It is provided with insulated walls to retain the heat in the bottled milk and it is heated only sufficiently to prevent the milk from cooling below the required temperature. This sterilizer or pasteurizer is accordingly merely an apparatus for retaining in the bottled milk the heat already contained in it so that practically the pasteurization is effected by the heat applied to the preheated milk and the heat contained in the heated bottles. Since the preheating of the milk is carried out in a flash or instantaneous heater it is possible to heat the milk considerably above the pasteurizing temperature for the necessary short interval of time without injuring it in its taste and properties, heat thus applied to the milk being made use of in the manner indicated to effect or assist in the pasteurization.

While the process of the present invention and the apparatus illustrative of the present invention have been described in connection with the pasteurization of milk, yet it will be understood that other liquids can be treated in a similar manner, the heat necessary for the pasteurization being applied principally to the liquid before bottling and to the bottles during the washing and scalding step. It will be understood also that variations can be made in carrying out the process and in the apparatus described without departing from the spirit and scope of the invention, as set forth in the accompanying claims.

Having described my invention, what I claim as new and desire to secure by Letters Patent, is—

1. The process of pasteurizing milk in bottles which comprises filling the bottles while in a highly heated condition with preheated unpasteurized milk and continuing the heating of the milk in said bottle to complete the pasteurization.

2. The process of pasteurizing milk in bottles which comprises washing and scalding the bottles, filling the bottles after scalding and while in a highly heated condition with preheated unpasteurized milk, and continuing the heating of the milk in said bottles to complete the pasteurization.

3. The process of pasteurizing milk in bottles which comprises filling the bottles while in a highly heated condition with unpasteurized milk preheated to about 130 to 150° F., and continuing the heating of the milk in said bottles at about 130 to 140° F. to complete the pasteurization.

4. The process of pasteurizing milk in bottles which comprises washing and scalding the bottles, filling the bottles while still heated to a temperature above that of pasteurization with unpasteurized milk preheated to about the pasteurization temperature, and continuing the heating of the milk in said bottles to complete the pasteurization.

5. The process of pasteurizing milk in bottles which comprises washing and scalding the bottles, filling the bottles after scalding and while still at a temperature above 130° F. with unpasteurized milk preheated to a temperature of about 130 to 150° F. and continuing the heating of the milk in said bottles at a temperature of about 130 to 140° F. to complete the pasteurization.

6. The process of pasteurizing liquids in containers which comprises filling heated bottles or other containers heated above the pasteurization temperature with the unpasteurized liquid preheated to about the pasteurization temperature and maintaining the heated liquid in the containers at the pasteurization temperature to effect pasteurization, whereby the heat of the containers and the preheating of the liquid are utilized for effecting the pasteurization.

7. The process of pasteurizing milk in bottles which comprises filling milk bottles heated above the pasteurization temperature with unpasteurized milk preheated to about the pasteurization temperature and preventing the cooling of the bottled milk below the pasteurization temperature until pasteurization has been effected.

8. The process of pasteurizing milk in bottles which comprises filling milk bottles heated to above 130° F. with unpasteurized milk heated to above 130° F. and preventing the cooling of the bottled milk below 130° F. until pasteurization has been effected.

9. The process of pasteurizing milk in bottles which comprises washing and scalding the milk bottles, filling said bottles while still heated above the pasteurization temperature with unpasteurized milk preheated to above the temperature necessary for pasteurization, and preventing the cooling of the bottled milk below the pasteurization temperature until pasteurization is effected, whereby the heat necessary to effect the pasteurization is supplied principally or entirely by the preheating of the milk and the heat contained in the heated bottles.

10. The process of pasteurizing milk and other liquids in bottles which comprises filling heated bottles heated above the pasteurization temperature with preheated unpasteurized milk or other liquid and maintaining the bottled liquid at the pasteurization temperature by means of dry heat until pasteurization is effected.

11. The process of pasteurizing milk in bottles which comprises filling milk bottles heated above the pasteurization temperature with unpasteurized milk preheated to about the pasteurization temperature and maintaining the bottled milk at the pasteurization temperature by means of dry heat until pasteurization has been effected.

In testimony whereof I affix my signature in the presence of two witnesses.

GODFREY M. S. TAIT.

Witnesses:
F. E. BARROWS,
A. F. CAFFREY.